(12) United States Patent
Niu et al.

(10) Patent No.: US 10,498,280 B1
(45) Date of Patent: Dec. 3, 2019

(54) ELECTRIC MOTOR WITH SHIELDED PHASE WINDINGS

(71) Applicants: Li Niu, San Jose, CA (US); Dillon J. Thomasson, Sunnyvale, CA (US); Kan Zhou, Sunnyvale, CA (US); David F. Nelson, Menlo Park, CA (US); Rui Guan, Sunnyvale, CA (US)

(72) Inventors: Li Niu, San Jose, CA (US); Dillon J. Thomasson, Sunnyvale, CA (US); Kan Zhou, Sunnyvale, CA (US); David F. Nelson, Menlo Park, CA (US); Rui Guan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 15/682,838

(22) Filed: Aug. 22, 2017

Related U.S. Application Data

(60) Provisional application No. 62/417,530, filed on Nov. 4, 2016, provisional application No. 62/379,289, filed on Aug. 25, 2016.

(51) Int. Cl.
*H02P 25/22* (2006.01)
*H02P 25/26* (2006.01)

(52) U.S. Cl.
CPC .............. *H02P 25/22* (2013.01); *H02P 25/26* (2013.01)

(58) Field of Classification Search
CPC .................................. H02P 25/26; H02P 25/22
USPC ........................................................... 318/797
See application file for complete search history.

(56) References Cited

U.S. PATENT DOCUMENTS

| | | | |
|---|---|---|---|
| 1,756,672 A | 4/1930 | Barr | |
| 3,621,311 A * | 11/1971 | Von Starck | H02K 41/025 310/13 |
| 3,914,859 A | 10/1975 | Pierson | |
| 4,801,832 A * | 1/1989 | Neumann | H02K 17/205 310/184 |
| 4,826,397 A * | 5/1989 | Shook | F01D 11/24 415/116 |
| 5,064,029 A | 11/1991 | Araki et al. | |
| 5,661,353 A | 8/1997 | Erdman et al. | |
| 5,979,087 A | 11/1999 | Bell et al. | |
| 6,202,285 B1 | 3/2001 | Bell | |
| 6,229,241 B1 | 5/2001 | Ishigami et al. | |
| 6,566,778 B1 | 5/2003 | Hasegawa et al. | |
| 6,915,556 B2 | 7/2005 | Lenoir et al. | |
| 7,923,883 B2 * | 4/2011 | Yamaguchi | H02K 15/067 310/179 |
| 8,319,388 B2 * | 11/2012 | Yoshino | H02K 17/185 310/212 |
| 8,344,581 B2 * | 1/2013 | Yabe | H02K 17/205 310/216.069 |
| 8,740,584 B2 * | 6/2014 | Yoshino | F04C 23/008 310/60 A |
| 9,166,462 B2 * | 10/2015 | Yabe | F04C 29/0085 |
| 9,287,759 B2 * | 3/2016 | Yabe | F04B 35/04 |
| 2003/0048032 A1 * | 3/2003 | Brown | H02K 15/066 310/254.1 |
| 2003/0201687 A1 | 10/2003 | Asai | |
| 2007/0149073 A1 | 6/2007 | Klaussner et al. | |

(Continued)

*Primary Examiner* — Jorge L Carrasquillo
*Assistant Examiner* — Devon A Joseph
(74) *Attorney, Agent, or Firm* — Young Basile Hanlon & MacFarlane, P.C.

(57) ABSTRACT

An electric motor includes a configuration that directs at least a portion of an electric field generated by phase windings into a stator.

7 Claims, 16 Drawing Sheets

(56) References Cited

U.S. PATENT DOCUMENTS

2009/0250279 A1* 10/2009 Holmes .................. B60L 58/21
  180/65.285
2010/0007235 A1   1/2010 Chretien et al.

* cited by examiner

US 10,498,280 B1

ELECTRIC MOTOR WITH SHIELDED PHASE WINDINGS

CROSS-REFERENCE TO RELATED APPLICATIONS

This application claims the benefit of U.S. Provisional Application No. 62/379,289, entitled "Electric Motor with Shielded Phase Windings," which was filed on Aug. 25, 2016 and is incorporated herein by reference in its entirety; this application also claims the benefit of U.S. Provisional Application No. 62/417,530, entitled "Electric Motor with Shielded Phase Windings," which was filed on Nov. 4, 2016 and is incorporated herein by reference in its entirety.

TECHNICAL FIELD

The application relates generally to electric motors.

BACKGROUND

Some electric motors are driven by multiphase pulse width modulation (PWM) voltages. Driving an electric motor with a PWM voltage creates a large amount of electrical noise, especially when compared with driving an electric motor with a continuous sinusoidal driving voltage. As a result of the electrical noise and parasitic capacitances, voltages build up on the rotor. When the voltage on the rotor becomes large, it may discharge from the rotor to the frame of the electric motor across the bearings. This may damage the bearings and/or the bearing races that retain and guide the bearings relative to the rotor and the frame of the electric motor. The damage to the rotor and bearing races that results from voltage discharge across the bearings may reduce the lifespan of the bearings and cause failure of the electric motor.

SUMMARY

One aspect of the disclosed embodiments is an electric motor that includes a rotor, a stator having an inner periphery, a slot formed in the stator, the slot having a slot width and the slot being oriented along a line, phase windings connected to the stator and disposed at least partially in the slot, and an opening that extends from the slot to the inner periphery of the stator. The opening is defined by opposed surfaces that are spaced apart by an opening width and the opening width is between five and twenty-five percent of the slot width.

Another aspect of the disclosed embodiments is an electric motor that includes a rotor, a stator, a slot formed in the stator, and phase windings that are connected to the stator and disposed at least partially in the slot. The electric motor also includes a shield that directs at least a portion of an electric field generated by the phase windings into the stator. The shield has a plurality of shield elements that are bonded together in an axially stacked configuration.

Another aspect of the disclosed embodiments is an electric motor that includes a rotor, a stator having an inner periphery, a slot formed in the stator, phase windings connected to the stator and disposed at least partially in the slot, an insulating element disposed in the slot between the phase windings and the rotor. The insulating element extends axially along an axial length of the slot. A shield layer is disposed on the insulating element to direct at least a portion of an electric field generated by the phase windings into the stator, and the shield layer is in contact with the stator.

DETAILED DESCRIPTION

The disclosure herein is directed to shields for electric motors that reduce parasitic capacitance between phase windings and a rotor of an electric motor by directing at least part of an electric field generated by the phase windings into the stator. The shields are positioned between the phase windings and the rotor and are formed from materials that are able to conduct the electric field. The shields may be in contact with the stator or formed as part of the stator.

Figure 1:
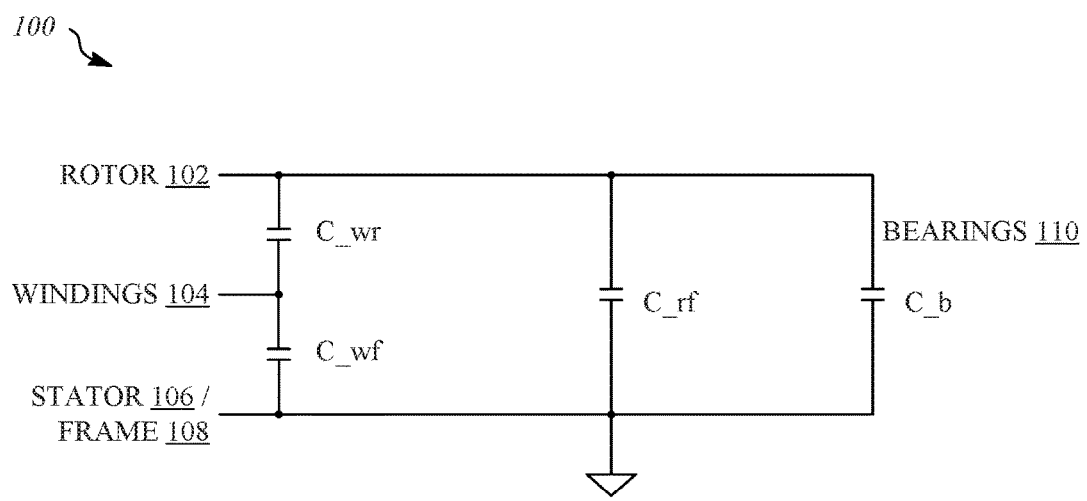
FIG. 1 is a circuit diagram showing parasitic capacitances acting on an electric motor.

FIG. 1 is a circuit diagram showing parasitic capacitances acting on an electric motor 100. The electric motor 100 includes a rotor 102, phase windings 104, a stator 106, a frame 108, and bearings 110. Common mode noise is coupled from the phase windings 104 to the bearings by parasitic capacitances between different metal parts of the electric motor 100. In particular, during operation of the electric motor 100, a parasitic capacitance C_wr is present from the phase windings 104 to the rotor 102, a parasitic capacitance C_wf is present from the phase windings 104 to the stator 106 and the frame 108, a parasitic capacitance C_rf is present from the rotor 102 to the frame 108, and a parasitic capacitance C_b is present across the bearings 110. As can be appreciated with reference to FIG. 1, the voltage across the bearings 110 may be reduced by decreasing the parasitic capacitance C_wr. The voltage across the bearings 110 may also be reduced by increasing the parasitic capacitance C_wf, or increasing the parasitic capacitance C_rf if the common mode noise source from the phase windings 104 to the stator 106 and the frame 108 is more like a current source rather than voltage source. Since many motor drives are equivalent to a voltage source, the source of the common mode noise has a relatively stiff voltage supply, and reducing the bearing voltage is most readily accomplished by reducing the parasitic capacitance C_wr.

In the electric motors described herein, structures are configured or incorporated to at least partially shield the rotor 102 from the electric field generated by the phase windings 104. As one example, shielding the rotor 102 may include interposing electrically conductive pathways between the phase windings 104 and the rotor 102, to cause the electric field from the phase windings 104 to flow into the stator 106 instead of into the rotor 102.

Figure 2:
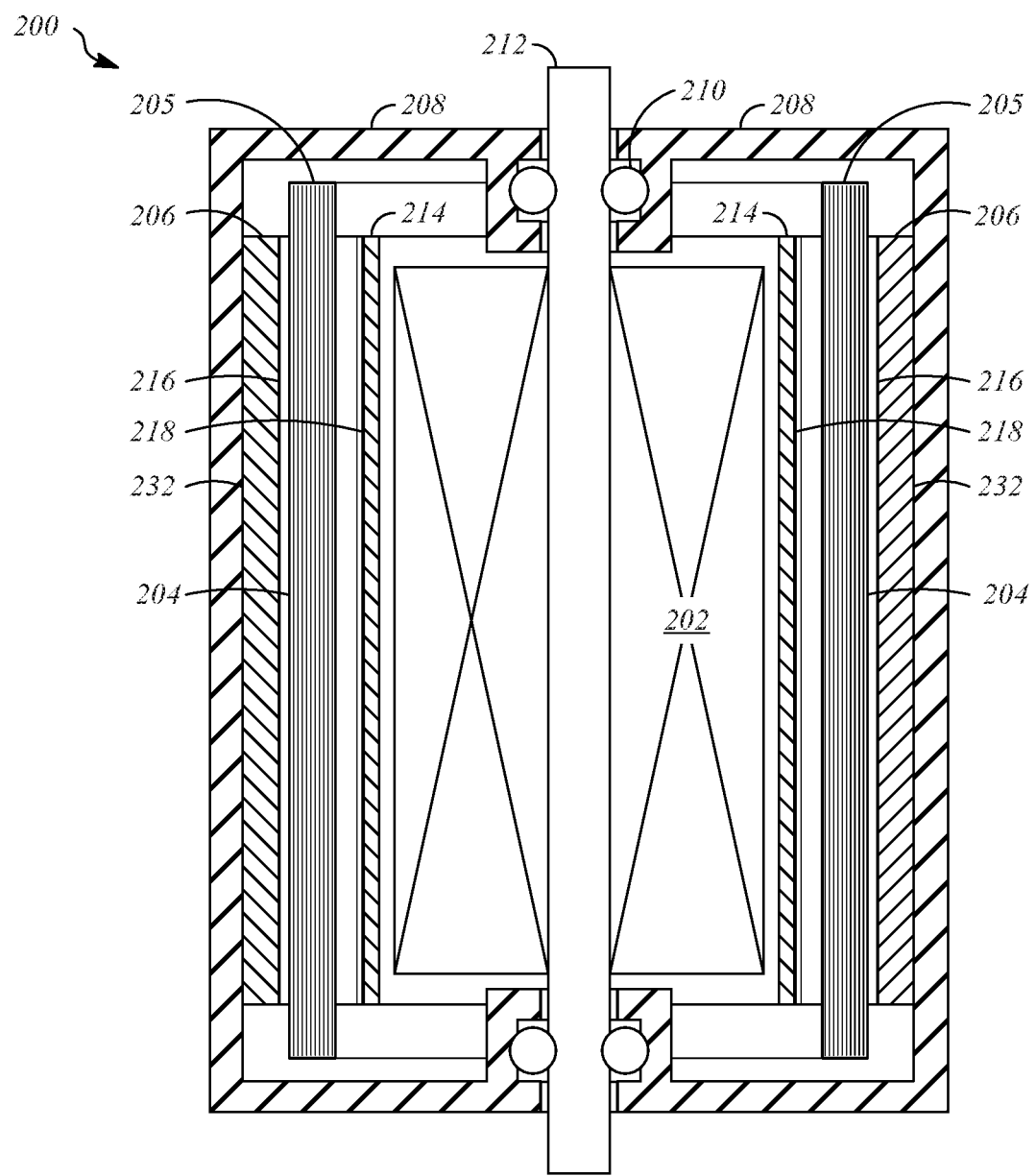
FIG. 2 is a side cross-section view of an electric motor according to a first example.

FIG. 2 is a side cross-section view of an electric motor 200 according to a first example. The electric motor 200 has a rotor 202, phase windings 204 that are connected to a stator 206, a frame 208, bearings 210, a shaft 212, and a shield 214. The stator 206 may be a laminated structure that is formed from a plurality of plates that are stacked axially and joined together. The stator 206 extends from an inner periphery 218 to an outer periphery 232. A plurality of slots 216 are formed in the stator 206. The phase windings 204 are partially disposed in the slots 216 and include end turn portions 205 that extend out of the slots 216. The shaft 212 is connected to the rotor 202 and is supported with respect to the frame 208 by the bearings 210. The phase windings 204 are energized and de-energized to induce torque on the rotor 202 in a conventional manner by interaction of magnetic fields generated by the phase windings 204 with magnets disposed in the rotor 202.

The shield 214 is positioned at the interior periphery of the stator 206 adjacent to a radial air gap between the stator 206 and the rotor 202. The shield 214 is formed from a material that is able to conduct the electric field, such as metal. The shield 214 functions to direct at least some of the electric field that is generated by the phase windings 204 back into the stator 206 so that it does not cross the radial air gap and enter the rotor. By reducing the amount of the electric field that is incident on the rotor 202, the parasitic capacitance C_wr is reduced. In some embodiments, the shield 214 may be an integral portion of the stator 206, formed by a geometric arrangement that guides the electric field. In some embodiments, the shield 214 may be formed separately from the stator 206 and are connected to the inner periphery of the stator 206.

Figure 3:
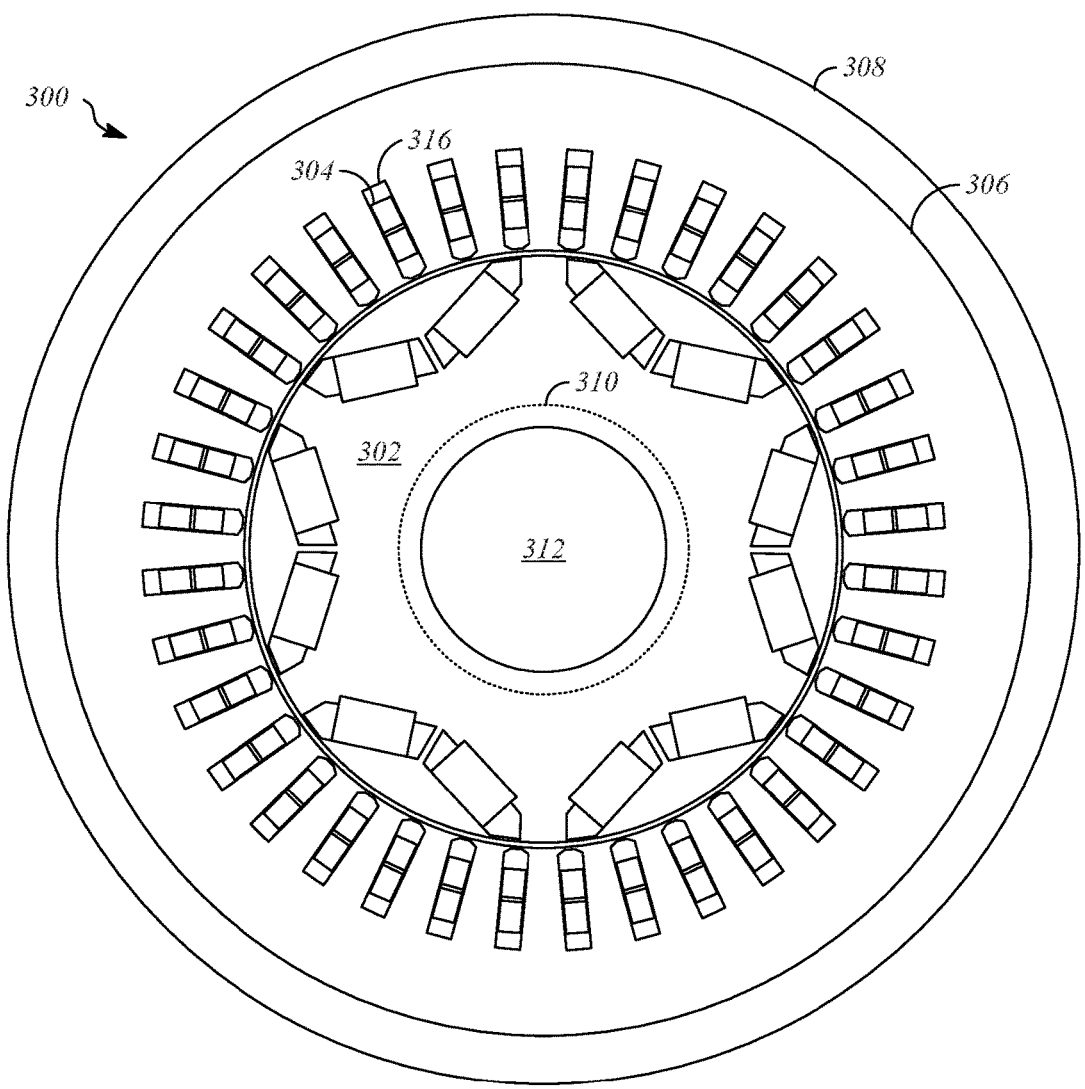
FIG. 3 is an axial cross-section view of an electric motor according to a second example.

FIG. 3 is an axial cross-section view of an electric motor 300 according to a second example. The electric motor 300 has a rotor 302, phase windings 304 that are connected to a stator 306, a frame 308, bearings 310, a shaft 312, and slots 316 that are formed in the stator 306 between portions of the stator 306 (e.g. stator teeth). The stator 306 may be a laminated structure that is formed from a plurality of plates that are stacked axially and joined together. The shaft 312 is connected to the rotor 302 and is supported with respect to the frame 308 by the bearings 310. The shaft 312 extends along an axis that defines a center of rotation for the rotor 302.

Figure 4:
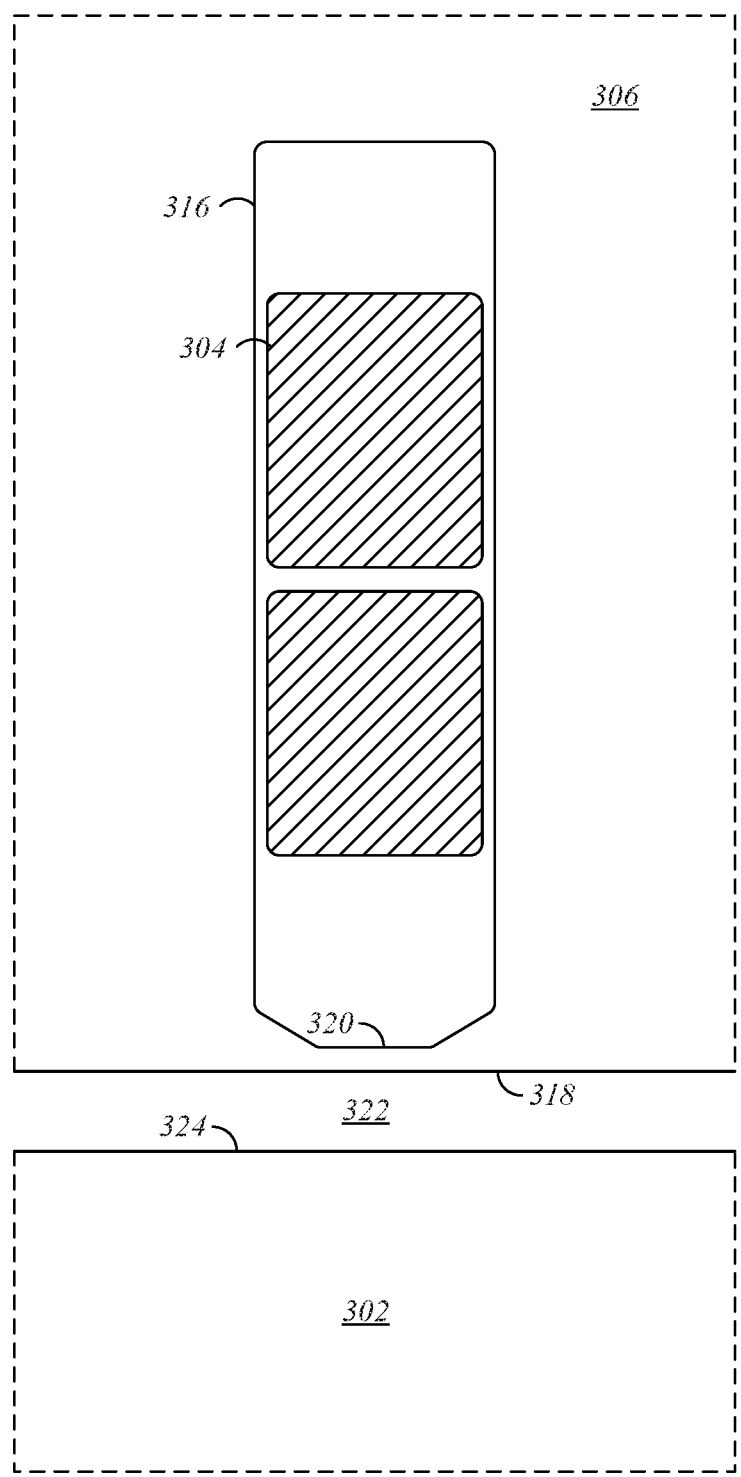
FIG. 4 is an illustration showing a stator slot of the electric motor of FIG. 3.

FIG. 4 is an illustration showing a portion of the rotor 302 and the stator 306 including one of the slots 316 of the stator 306 electric motor 300 of FIG. 3. The phase windings 304 are disposed at least partially in the slots 316 that are formed in the stator 306. In the illustrated example, the phase windings 304 are bar-wound type phase windings, but other configurations may be used. The slots 316 are closed ended slots that lack openings to an inner periphery 318 of the stator 306. Thus, a portion of the stator 306 is positioned between an internal radial wall 320 of the slot 316 and the inner periphery 318 of the stator 306 in the radial direction. This portion of the stator 306 serves as a shield and directs at least some of the electric field that is generated by the phase windings 304 back into the stator 306 so that it does not enter the rotor 302.

A radial air gap 322 is present between the inner periphery 318 of the stator 306 and an outer periphery 324 of the rotor 302. In some embodiments, a radial width of the radial air gap 322 is larger than a radial distance between the inner periphery 318 of the stator 306 and the internal radial wall 320. The internal radial wall 320 may be the closest portion of each of the slots 316 to the inner periphery 318 of the stator 306.

By reducing the electric field that is incident on the rotor 302, the parasitic capacitance C_wr is reduced. Thus, by connecting the stator teeth, inward facing radial slot openings are avoided, and the rotor 302 is naturally shielded from the winding by changing the configuration of the stator 306, which may be done without adding additional parts to the electric motor 300. Eddy current is also well controlled in embodiments where the stator 306 is formed from a stack of laminated metal plates. In some embodiments, the electric motor 300 may be a bar-wound type motor in which the phase windings 304 do not need to be inserted through radially open ends of the slots 316.

Figure 5:
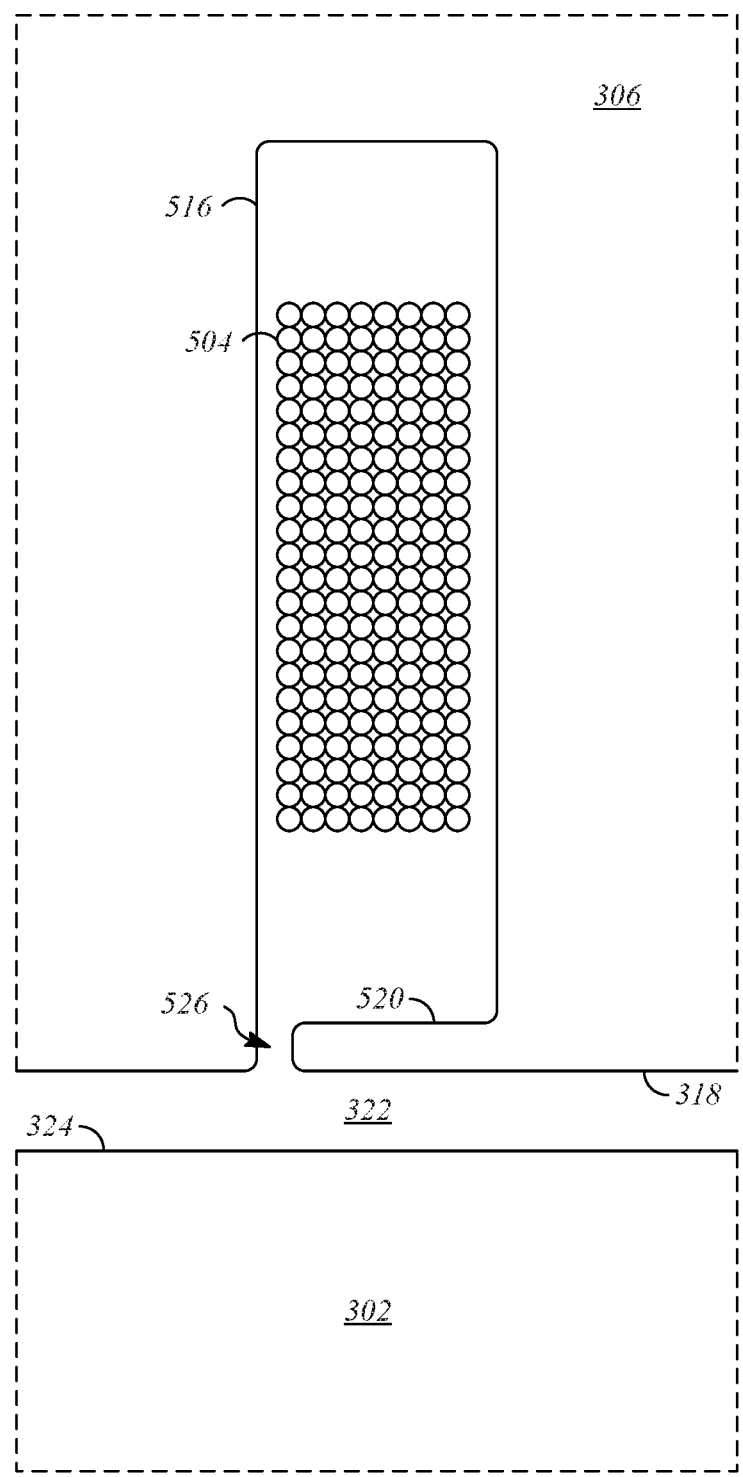
FIG. 5 is an illustration showing a first alternative stator slot that can be used with the electric motor of FIG. 3.

FIG. 5 is an illustration showing a slot 516 that can be used with the electric motor 300 of FIG. 3, which is as previously described except as stated herein.

The slot 516 is open-ended at the inner periphery 318 of the stator 306, with an opening 526 extending from the interior of the slot 516 to the radial air gap 322. The opening 526 has a width that is less than the full width of the slot 516. As an example, the width of the opening 526 may be selected so that it is sufficient to allow winding of phase windings 504 with respect to the stator 306. In the illustrated example, the phase windings 504 are of the wire-wound type, but other configurations may be utilized. The width of the opening 526 may be, for example, between five percent and twenty-five percent of the width of the slot 516. In some embodiments, the width of the opening 526 is smaller than the radial width of the radial air gap 322. An internal radial wall 520 may extend radially across the end of the slot 516 adjacent to the opening, such that a portion of the stator 306 is positioned between the slot 516 and the radial air gap 322 adjacent to the opening.

Figure 6:
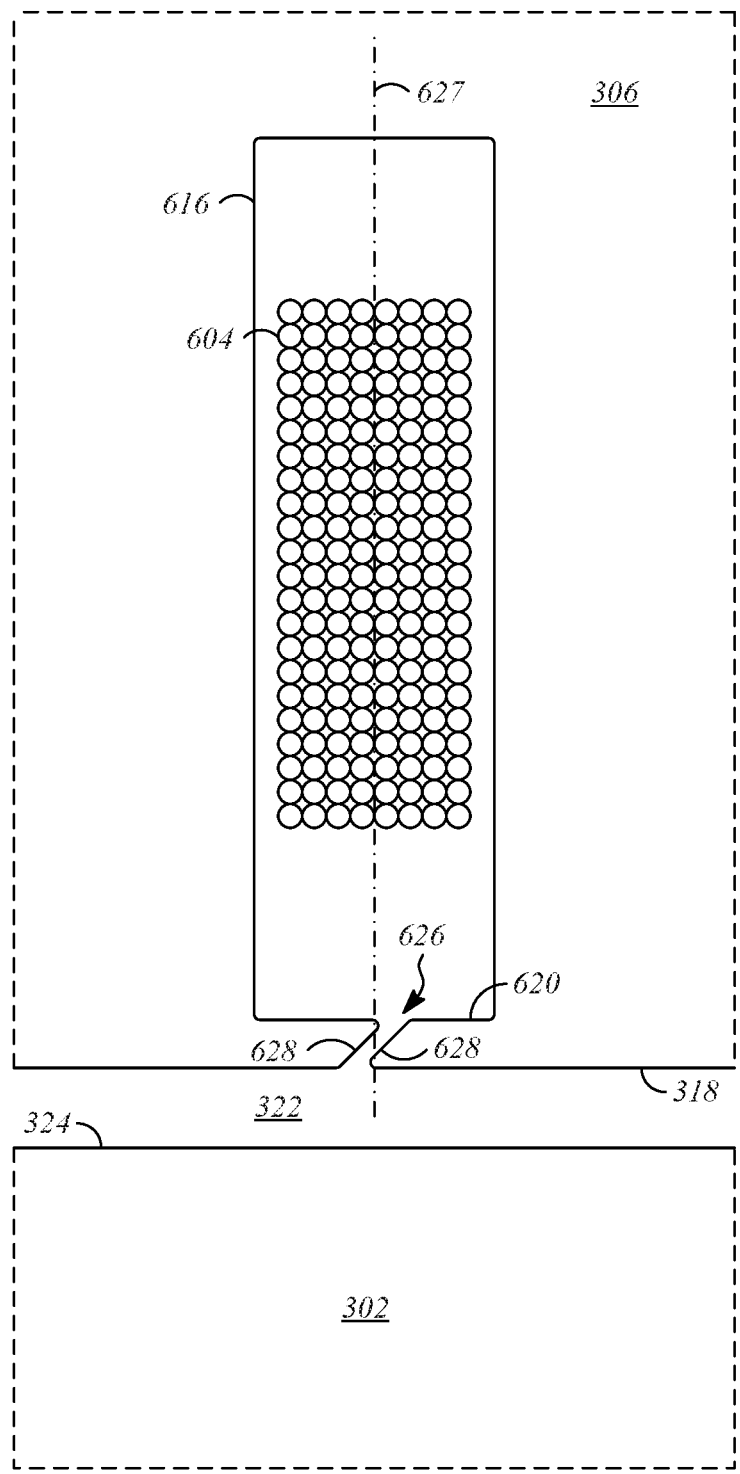
FIG. 6 is an illustration showing a second alternative stator slot that can be used with the electric motor of FIG. 3.

FIG. 6 is an illustration showing a slot 616 that can be used with the electric motor 300 of FIG. 3, which is as previously described except as stated herein.

The slot 616 is open-ended at the inner periphery 318 of the stator 306, with an opening 626 extending from the interior of the slot 616 to the radial air gap 322. The opening 626 has a width that is less than the full width of the slot 516. As an example, the width of the opening 526 may be selected so that it is sufficient to allow winding of phase windings 604 with respect to the stator 306. In the illustrated example, the phase windings 604 are of the wire-wound type, but other configurations may be utilized. The width of the opening 626 may be, for example, between five percent and twenty-five percent of the width of the slot 516. In some embodiments, the width of the opening 626 is smaller than the radial width of the radial air gap 322. An internal radial wall 620 may extend radially across the end of the slot 516 adjacent to the opening, such that a portion of the stator 306 is positioned between the slot 516 and the radial air gap 322 adjacent to the opening 526.

The opening 626 is oriented at an angle relative to the slot 616. As an example, the slot 616 may be oriented along a line 627 that extends in the radial direction of the electric motor 300 (i.e., radially outward from center of the shaft 312 and/or the rotor 302). The opening is defined by opposed surfaces 628. In some embodiments, opposed surfaces 628 may be spaced at a constant distance, and may be parallel to one another. The opposed surfaces 628 may extend at an angle relative to the line 627, such as at an angle between 15 degrees and 75 degrees. In some implementations, the width and angle of the opening are configured such that any straight-line path between the phase windings 604 and the rotor 602 is obstructed by a portion of the stator, while maintaining an unobstructed non-straight-line path through the opening 626.

Figure 7:
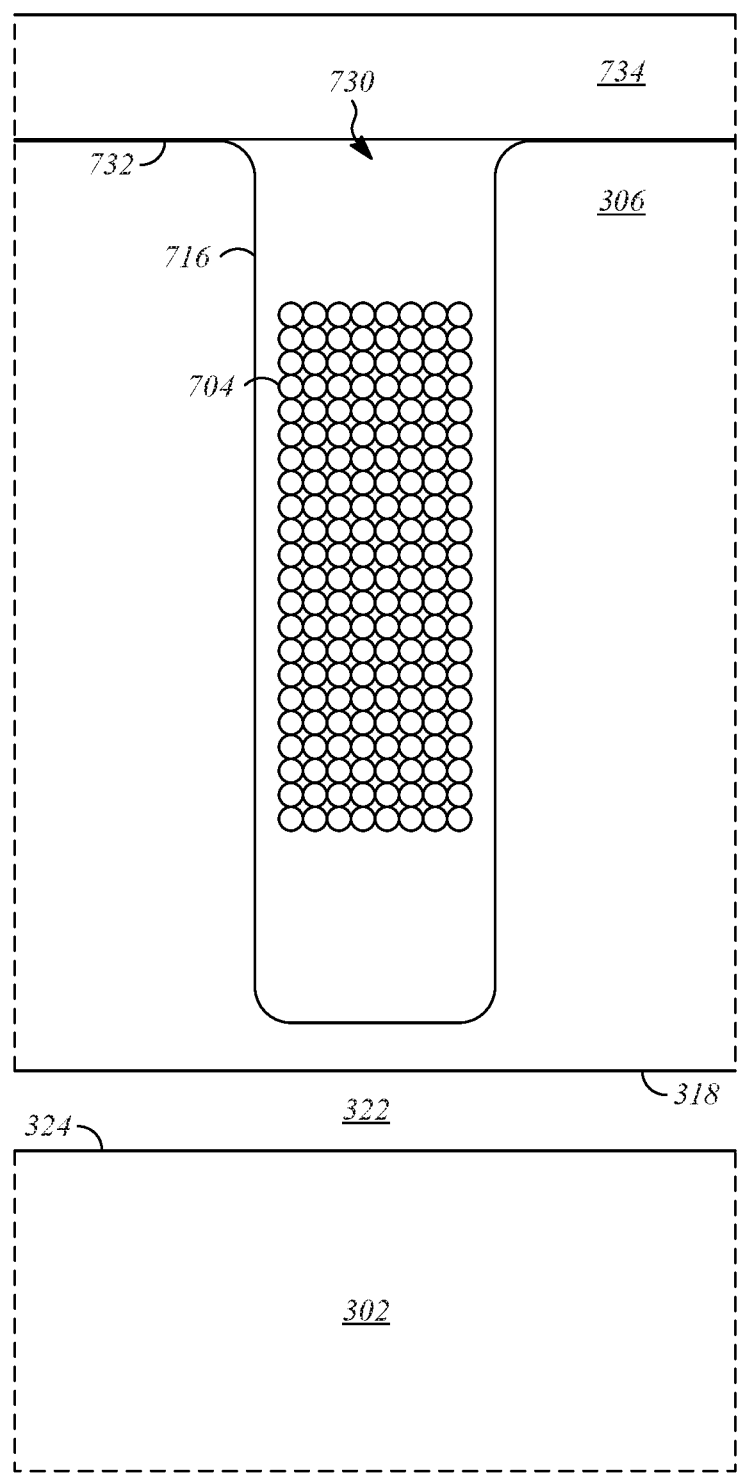
FIG. 7 is an illustration showing a third alternative stator slot that can be used with the electric motor of FIG. 3.

FIG. 7 is an illustration showing a slot 716 that can be used with the electric motor 300 of FIG. 3, which is as previously described except as stated herein.

The slot 716 is close-ended at the inner periphery 318 of the stator 306, and has an open end 730 at an outer periphery 732 of the stator 306. Phase windings 704 are disposed in the slot 716. In the illustrated example, the phase windings 704 are of the wire-wound type, but other configurations may be utilized. To retain the phase windings 704 in the slot 716, a retaining structure 734 is positioned radially outward from the stator 306 and may be in engagement with the outer periphery 732 of the stator 306. In some embodiments, the retaining structure is a sleeve, and may be a laminated sleeve formed of stacked plates. In some embodiments, the retaining structure 734 is the frame 308 of the electric motor 300.

Figure 8:
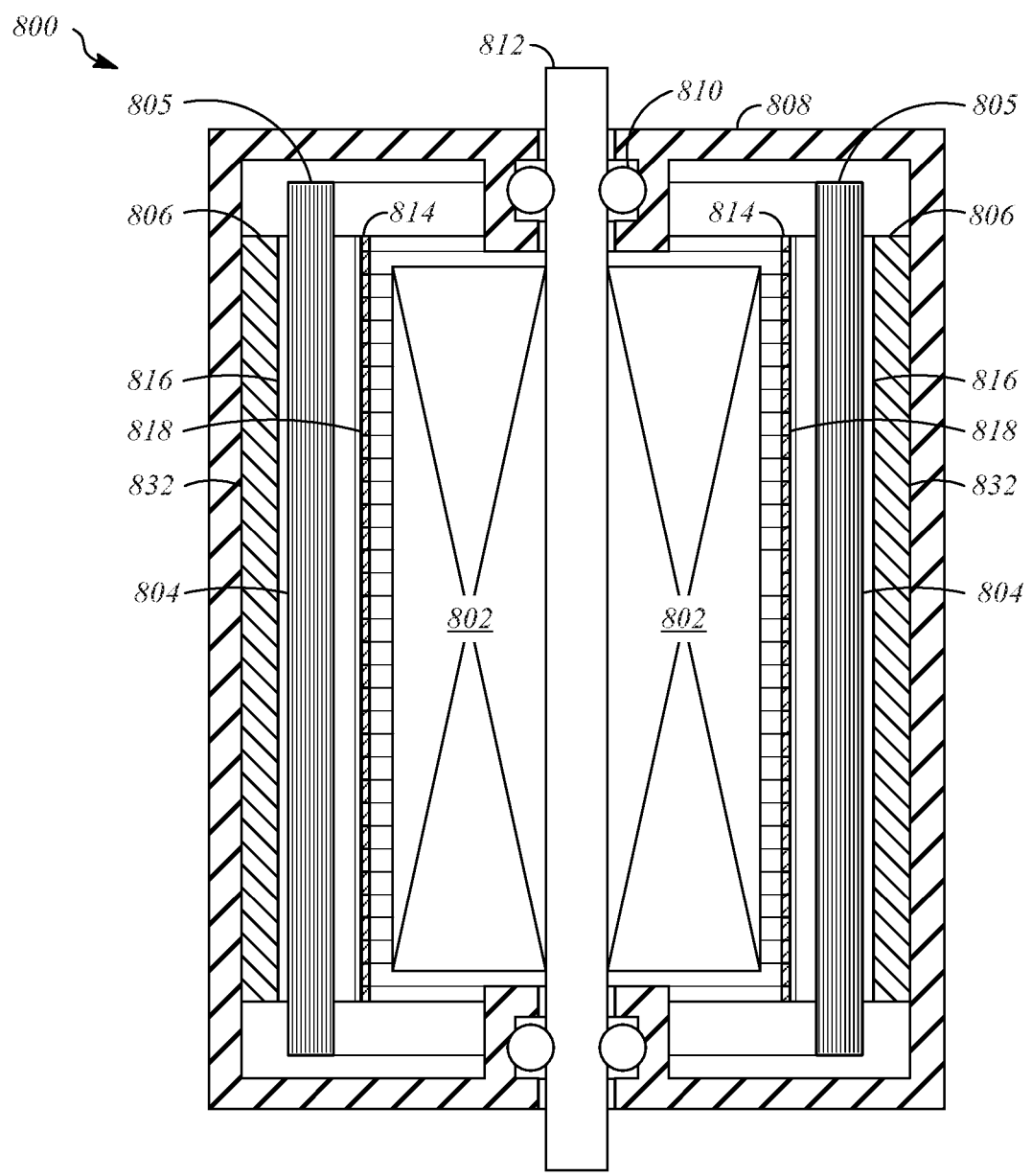
FIG. 8 is a side cross-section view of an electric motor according to a third example.

FIG. 8 is a side cross-section view of an electric motor 800 according to a third example. The electric motor 800 has a rotor 802, phase windings 804 that are connected to a stator 806, a frame 808, bearings 810, a shaft 812, and a shield assembly. In the illustrated example, the phase windings 804 are of the wire-wound type, but other configurations may be utilized. The stator 806 may be a laminated structure that is formed from a plurality of plates that are stacked axially and joined together. The stator 806 extends from an inner periphery 818 to an outer periphery 832. A plurality of slots 816 are formed in the stator 806. The phase windings 804 are partially disposed in the slots 816 and include end turn portions 805 that extend out of the slots 816. The shaft 812 is connected to the rotor 802 and is supported with respect to the frame 808 by the bearings 810. To guide electric field from the phase windings 804 back into the stator 806, the electric motor 800 includes a shield assembly 814 in the form of a thin-walled cylindrical structure that is positioned between the rotor 802 and the stator 806, such as by attachment to an inner periphery of the stator 806. Thus, the stator 806 is adjacent to and in contact with an exterior surface of the shield assembly 814, and the rotor 802 is adjacent to an interior surface of the shield assembly 814 and is spaced from the interior surface of the shield assembly 814 by a radial air gap.

Figure 9:
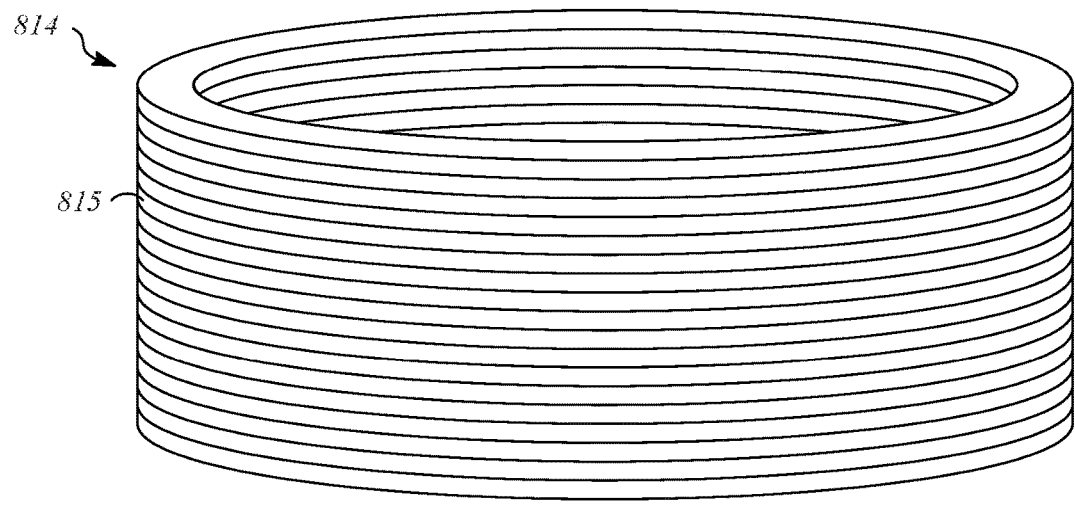
FIG. 9 is a perspective view illustration that shows a shield assembly of the electric motor of FIG. 8.

FIG. 9 is a perspective view illustration that shows the shield assembly 814. The shield assembly includes a plurality of shield elements such as shield rings 815 that are connected together. Each shield ring 815 has an axial height that is a fraction of the axial height of the stator 806. As an example, each shield ring 815 may have an axial height between 0.5 percent and five percent of the axial height of the stator 806. Each shield ring 815 may be a one piece structure with a continuous outer periphery and a continuous inner periphery. As an example, the shield rings 815 may be formed by stamping. The shield rings 815 are stacked in an axially adjacent configuration with respect to each other to define a substantially cylindrical structure that is positioned at the interior periphery of the stator 806 adjacent to a radial air gap between the stator 806 and the rotor 802. Thus, the shield assembly 814 may be a laminated structure formed from a plurality of the shield rings 815 that are bonded together. By forming the shield assembly 814 from a plurality of the shield rings 815, eddy currents in the axial direction are reduced. During fabrication of the electric motor 800, the shield rings 815 may be installed after the phase windings 804 are installed, which allows installation of the phase windings 804 with respect to the stator by winding.

The shield rings 815 are formed from a material that is able to conduct an electric field, such as metal. The shield rings 815 function to direct at least some of the electric field that is generated by the phase windings 804 back into the stator 806 so that it does not cross the radial air gap and enter the rotor. By reducing the electric field that is incident on the rotor 802, the parasitic capacitance C_wr is reduced. The shield rings 815 are formed separately from the stator 806 and are connected to the inner periphery of the stator 806 in order to guide the portion of the electric field that is incident upon the shield rings 815 back into the stator 806.

Figure 10:
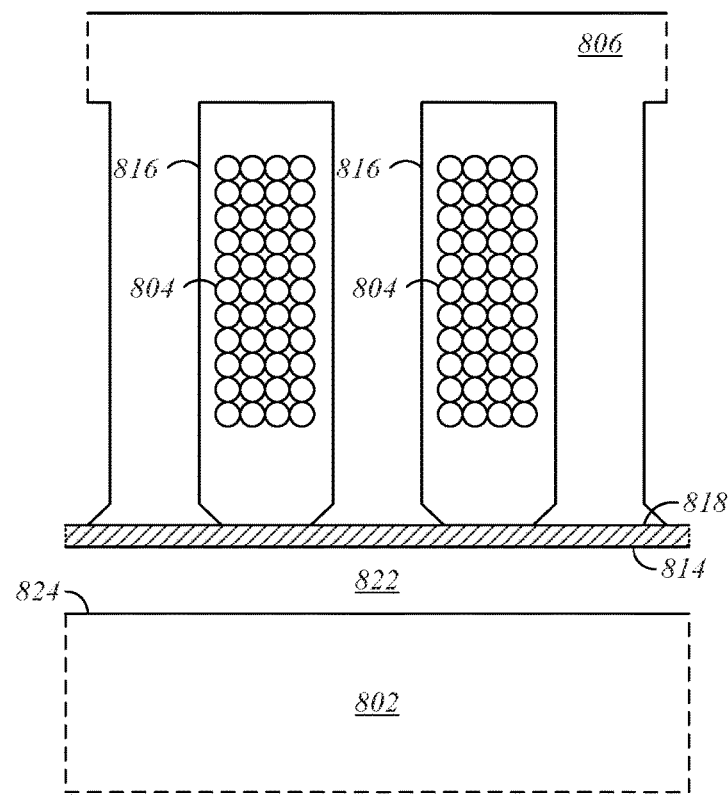
FIG. 10 is an illustration showing a portion of the rotor and the stator of the electric motor of FIG. 8.

FIG. 10 is an illustration showing a portion of the rotor 802 and the stator 806 of the electric motor 800 of FIG. 8. The phase windings 804 are disposed at least partially in the slots 816 that are formed in the stator 806. The slots 816 are open ended slots that extend radially outward from openings at the inner periphery 818 of the stator 806. The shield assembly 814 is positioned radially inward from the stator 806 and may be in contact with the inner periphery 818 of the stator 806.

A radial air gap 822 is present between the shield rings 815 and an outer periphery 824 of the rotor 802. The shield rings 815 are positioned between the open ends of slots 816 and the rotor 802. Thus, the shield rings 815 are also positioned between the phase windings 804 and the rotor 802. Because the electric field generated by the phase windings 804 passes through the shield rings 815 before reaching the rotor 802, at least some of the electric field that is generated by the phase windings 804 is directed back into the stator 806 by the shield rings 815 so that it does not enter the rotor 802. By reducing the amount of the electric field that is incident on the rotor 802, the parasitic capacitance C_wr is reduced.

Figure 11:
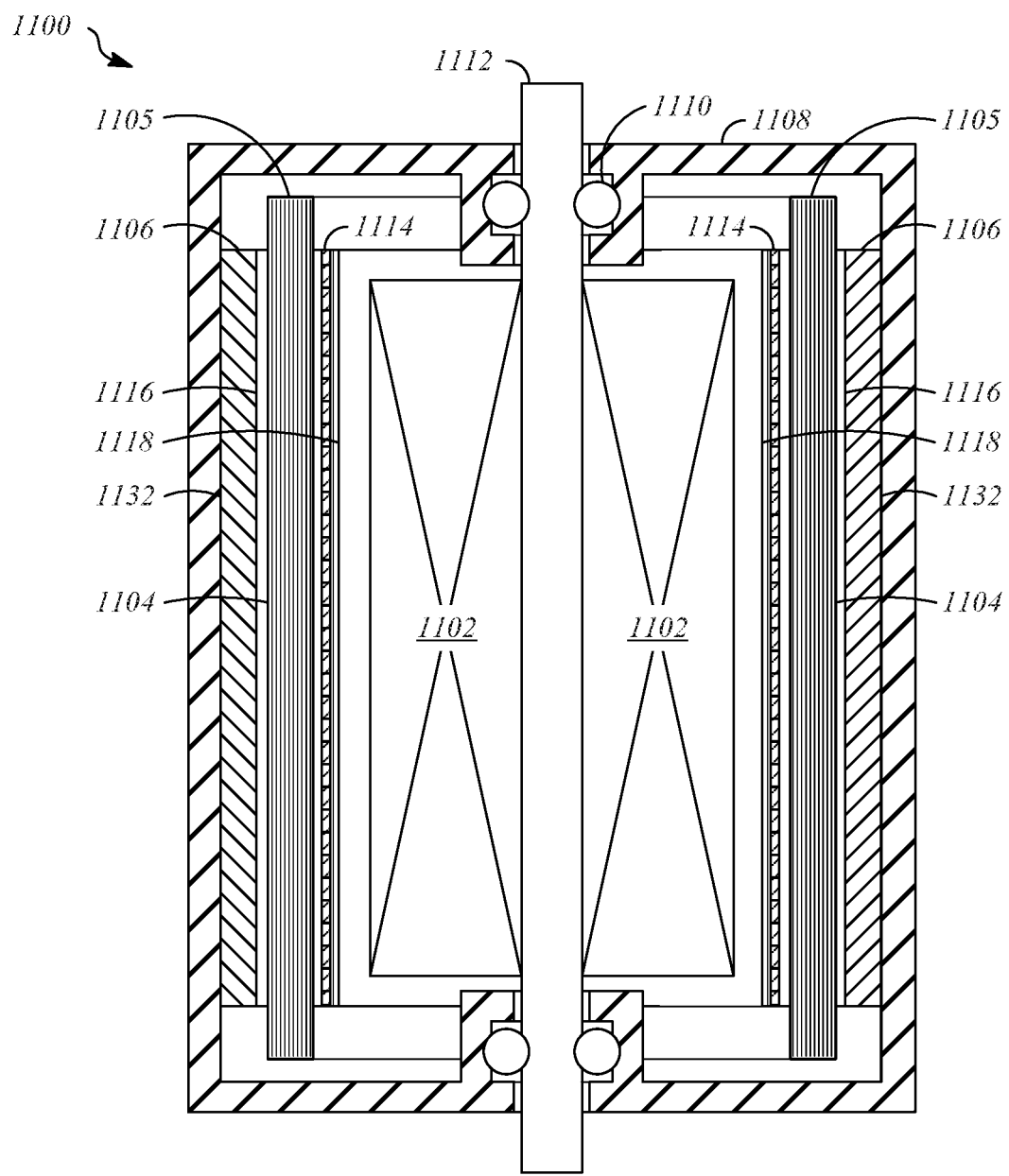
FIG. 11 is a side cross-section view of an electric motor according to a fourth example.

FIG. 11 is a side cross-section view of an electric motor 1100 according to a fourth example. The electric motor 1100 has a rotor 1102, phase windings 1104 that are connected to a stator 1106, a frame 1108, bearings 1110, a shaft 1112, and a plurality of shield structures 1114 that are each associated with one of a plurality of slots 1116 of the stator 1106. In the illustrated example, the phase windings 1104 are of the wire-wound type, but other configurations may be utilized. The stator 1106 may be a laminated structure that is formed from a plurality of plates that are stacked axially and joined together. The stator 1106 extends from an inner periphery 1118 to an outer periphery 1132. The phase windings 1104 are partially disposed in the slots 1116 and include end turn portions 1105 that extend out of the slots 1116. The shaft 1112 is connected to the rotor 1102 and is supported with respect to the frame 1108 by the bearings 1110.

Figure 12:
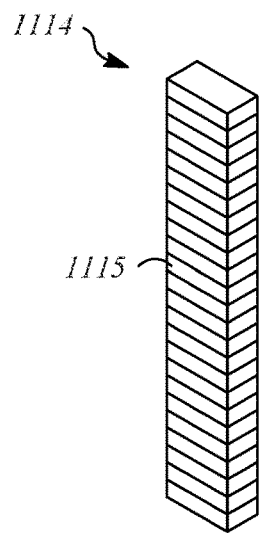
FIG. 12 is a perspective view illustration that shows a shield structure of the electric motor of FIG. 11.

FIG. 12 is a perspective view illustration that shows one of the shield structures 1114. The shield structure 1114 includes a plurality of shield elements such as shield plates 1115 that are connected together. Each shield plate 1115 has an axial height that is a fraction of the axial height of the stator 1106. As an example, each shield plate 1115 may have an axial height between 0.5 percent and five percent of the axial height of the stator 1106. The shield plates 1115 are stacked in an axially adjacent configuration with respect to each other to define elongate structures that are each positioned within one of the plurality of slots 1116 of the stator 1106, radially outward from the inner periphery 1118 of the stator 1106. In addition, the shield plates 1115 may be bonded together to form a laminated structure. Thus, each shield structure 1114 may be in the form of an axial stack of a plurality of the shield plates 1115 that is present in each of the slots 1116 of the stator 1106. By forming the shield assembly from a plurality of the shield plates 1115 that are segmented axially, eddy currents in the axial direction are reduced. During fabrication of the electric motor 1100, the shield plates 1115 may be installed after the phase windings 1104 are installed, which allows installation of the phase windings 1104.

The shield plates 1115 are formed from a material that is able to conduct the electric field, such as metal. The shield plates 1115 function to direct at least some of the electric field that is generated by the phase windings 1104 back into the stator 1106 so that it does not cross the radial air gap and enter the rotor. By reducing the amount of the electric field that is incident on the rotor 1102, the parasitic capacitance $C\_wr$ is reduced. The shield plates 1115 are formed separately from the stator 1106 and are connected to the stator 1106 inside the slots 1116 in order to guide the portion of the electric field that is incident upon the shield plates 1115 back into the stator 1106.

Figure 13:
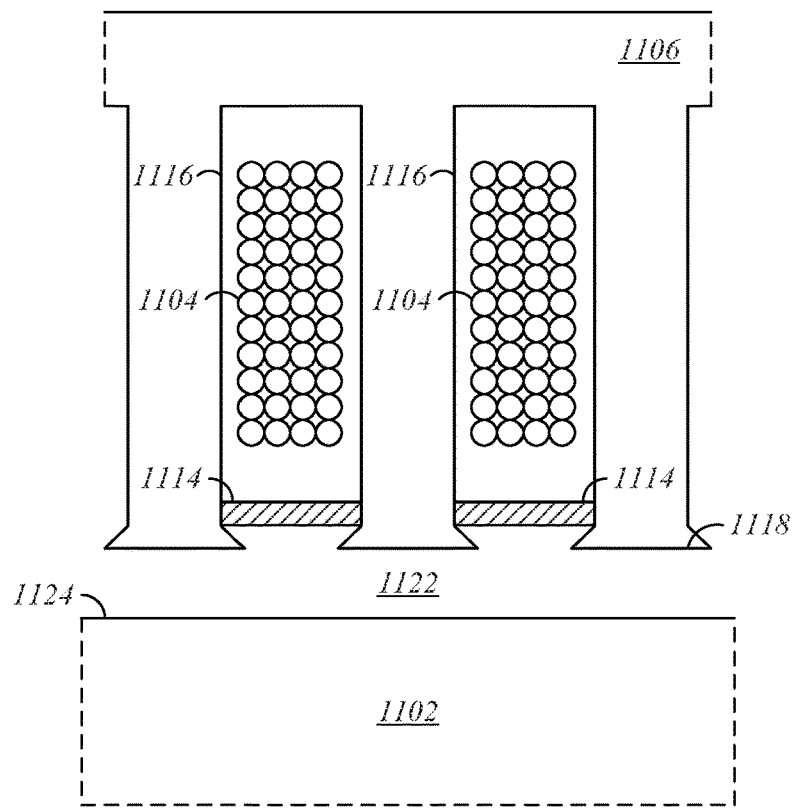
FIG. 13 is an illustration showing a portion of the rotor and the stator of the electric motor of FIG. 11.

FIG. 13 is an illustration showing a portion of the rotor 1102 and the stator 1106 of the electric motor 1100 of FIG. 11. The phase windings 1104 are disposed at least partially in the slots 1116 that are formed in the stator 1106. The slots 1116 are open ended slots that extend radially outward from openings at the inner periphery 1118 of the stator 1106. The shield plates 1115 are positioned radially inward from the inner periphery 1118 of the stator 1106 and extend across the slots 1116 such that they are in contact with opposed internal surfaces of the slots 1116.

The shield plates 1115 are positioned between the phase windings 1104 and the open ends of slots 1116. A radial air gap 1122 is present between inner periphery 1118 of the stator 1106 and the outer periphery 1124 of the rotor 1102. Thus, the shield plates 1115 are also positioned between the phase windings 1104 and the rotor 1102. Because the electric field generated by the phase windings 1104 passes through the shield plates 1115 before reaching the rotor 1102, at least some of the electric field that is generated by the phase windings 1104 is directed back into the stator 1106 by the shield plates 1115 so that it does not enter the rotor 1102. By reducing the amount of the electric field that is incident on the rotor 1102, the parasitic capacitance $C\_wr$ is reduced.

Figure 14:
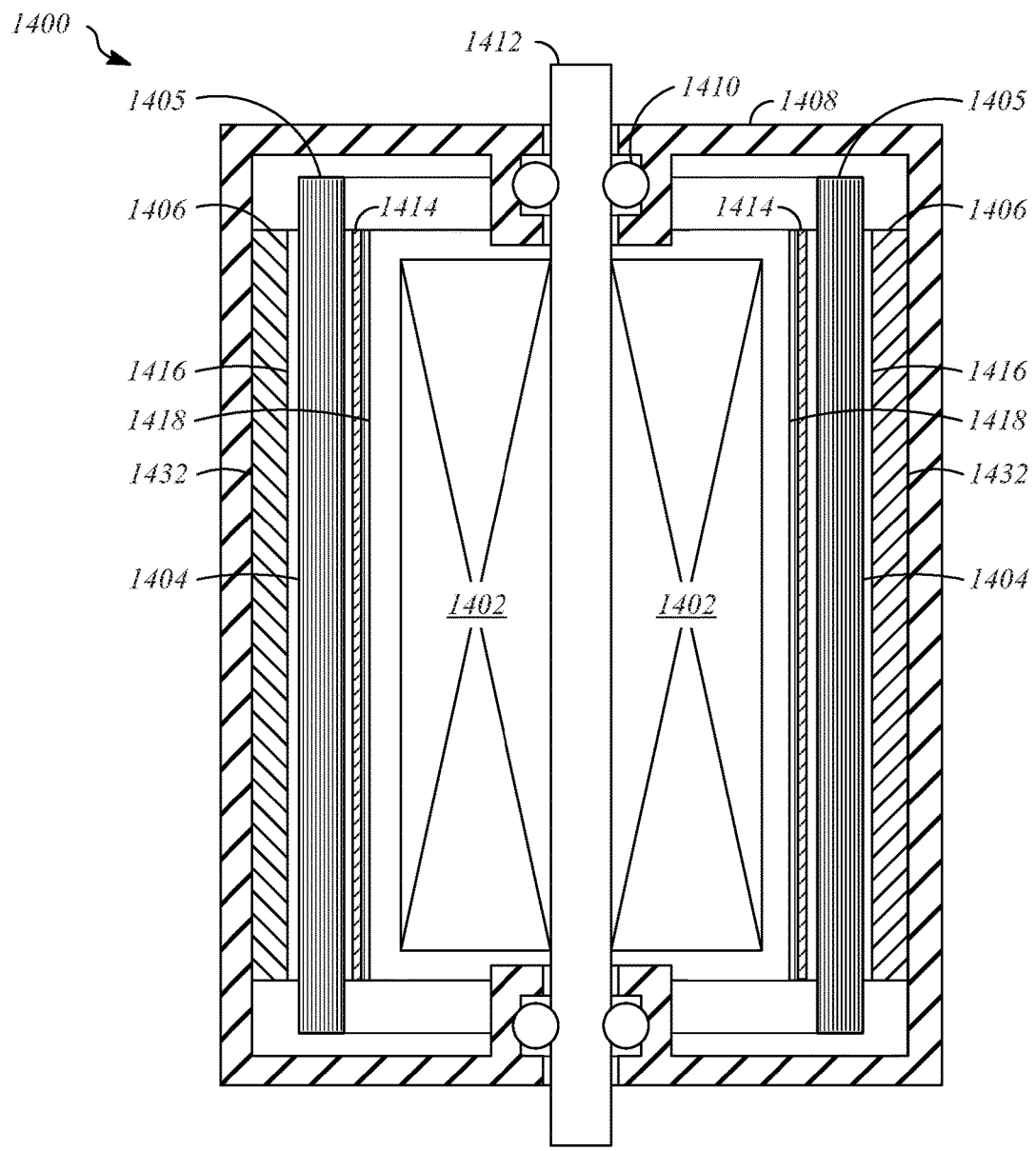
FIG. 14 is a side cross-section view of an electric motor according to a fifth example.

FIG. 14 is a side cross-section view of an electric motor 1400 according to a fifth example. The electric motor 1400 has a rotor 1402, phase windings 1404 that are connected to a stator 1406, a frame 1408, bearings 1410, a shaft 1412, and a shield assembly. In the illustrated example, the phase windings 1404 are of the wire-wound type, but other configurations may be utilized. The stator 1406 may be a laminated structure that is formed from a plurality of plates that are stacked axially and joined together. The stator 1406 extends from an inner periphery 1418 to an outer periphery 1432. A plurality of slots 1416 are formed in the stator 1406. The phase windings 1404 are partially disposed in the slots 1416 and include end turn portions 1405 that extend out of the slots 1416. The shaft 1412 is connected to the rotor 1402 and is supported with respect to the frame 1408 by the bearings 1410.

The shield assembly includes a plurality of shielded insulators 1414. Each shielded insulator 1414 may have an axial height that is between eighty and one hundred and twenty percent of the axial height of the stator 1406, and in some embodiments, each of the shielded insulators 1414 may have an axial height that is equal to or substantially equal to the axial height of the stator 1406. Each shielded insulator 1414 may be an elongate structure that is positioned within one of the plurality of slots 1416 of the stator 1406, radially outward from the inner periphery 1418 of the stator 1406. Each shield insulator 1414 extends axially along an axial length of a respective one of the slots 1416. During fabrication of the electric motor 1400, the shielded insulators 1414 may be installed after the phase windings 1404 are installed, which allows installation of the phase windings 1404 through the openings of the slots 1416, such as by winding.

Figure 15:
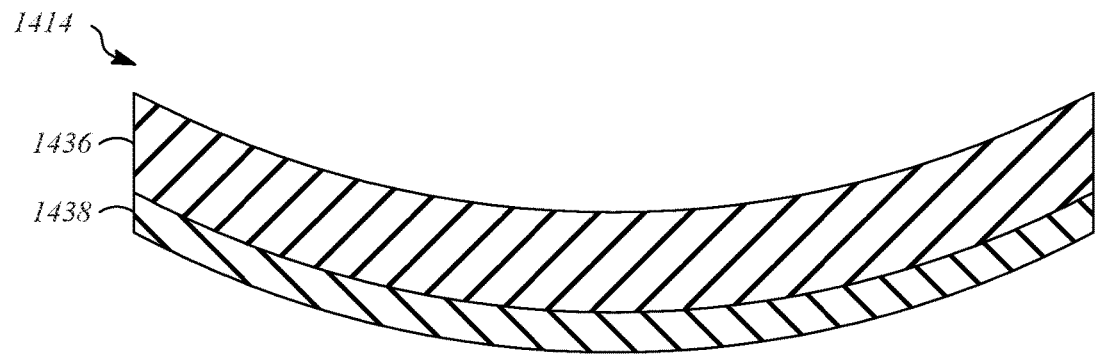
FIG. 15 is an illustration showing an axial cross-section a shielded insulator of the electric motor of FIG. 14.

FIG. 15 is an illustration showing an axial cross-section view of one of the shielded insulators 1414. Each of the shielded insulators 1414 has an insulating layer 1436 and a shield layer 1438. The insulating layer 1436 is made of a material that has electrical insulation properties, such as paper, and which does not readily conduct the electric field. The shield layer 1438 is disposed on one side of the insulating layer 1436 and is formed from a material that is able to conduct the electric field, such as metal. In some embodiments, the shield layer 1438 is a coating that is applied to the insulating layer 1436, such as by spraying. In some embodiments, the shield layer 1438 is laminated to the insulating layer 1436.

The shielded insulators are installed in the slots 1416 of the stator 1406 such that the insulating layer 1436 faces toward the phase windings 1404 and the shield layer 1438 faces away from the phase windings 1404. The shielded insulators 1414 each extend axially along the length of a respective one of the slots 1416 along a slot opening. The shield layer 1438 of each of the shielded insulators 1414 contacts the stator 1406, for example, at opposed internal walls of each of the slots 1416, such that the shielded insulators 1414 function to direct at least some of the electric field that is generated by the phase windings 1404 back into the stator 1406 so that it does not cross the radial air gap and enter the rotor. By reducing the electric field that is incident on the rotor 1402, the parasitic capacitance $C\_wr$ is reduced.

The shielded insulators 1414 are formed separately from the stator 1406 and are connected to the stator 1406 such as by placing them inside the slots 1416 in order to guide the portion of the electric field that is incident upon the shielded insulators 1414 back into the stator 1406.

Figure 16:
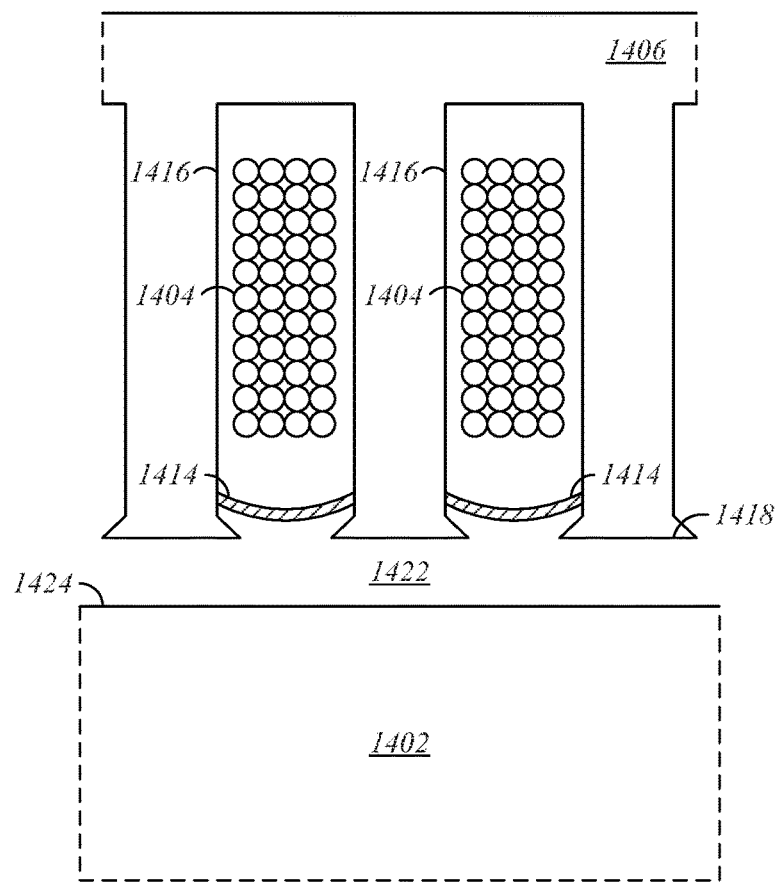
FIG. 16 is an illustration showing a portion of the rotor and the stator of the electric motor of FIG. 14.

FIG. 16 is an illustration showing a portion of the rotor 1402 and the stator 1406 of the electric motor 1400 of FIG. 14. The phase windings 1404 are disposed at least partially in the slots 1416 that are formed in the stator 1406. The slots 1416 are open ended slots that extend radially outward from openings at the inner periphery 1418 of the stator 1406. The shielded insulators 1414 are positioned radially inward from the inner periphery 1418 of the stator 1406 and extend across the slots 1416 such that they are in contact with opposed internal surfaces of the slots 1416.

The shielded insulators 1414 are positioned between the phase windings 1404 and the open ends of slots 1416. A radial air gap 1422 is present between inner periphery 1418 of the stator 1406 and the outer periphery 1424 of the rotor 1402. Thus, the shielded insulators 1414 are also positioned between the phase windings 1404 and the rotor 1402. Because the electric field generated by the phase windings 1404 passes through the shielded insulators 1414 before reaching the rotor 1402, at least some of the electric field that is generated by the phase windings 1404 is directed back into the stator 1406 by the shielded insulators 1414 so that it does not enter the rotor 1402. By reducing the amount of the electric field that is incident on the rotor 1402, the parasitic capacitance C_wr is reduced.

Figure 17:
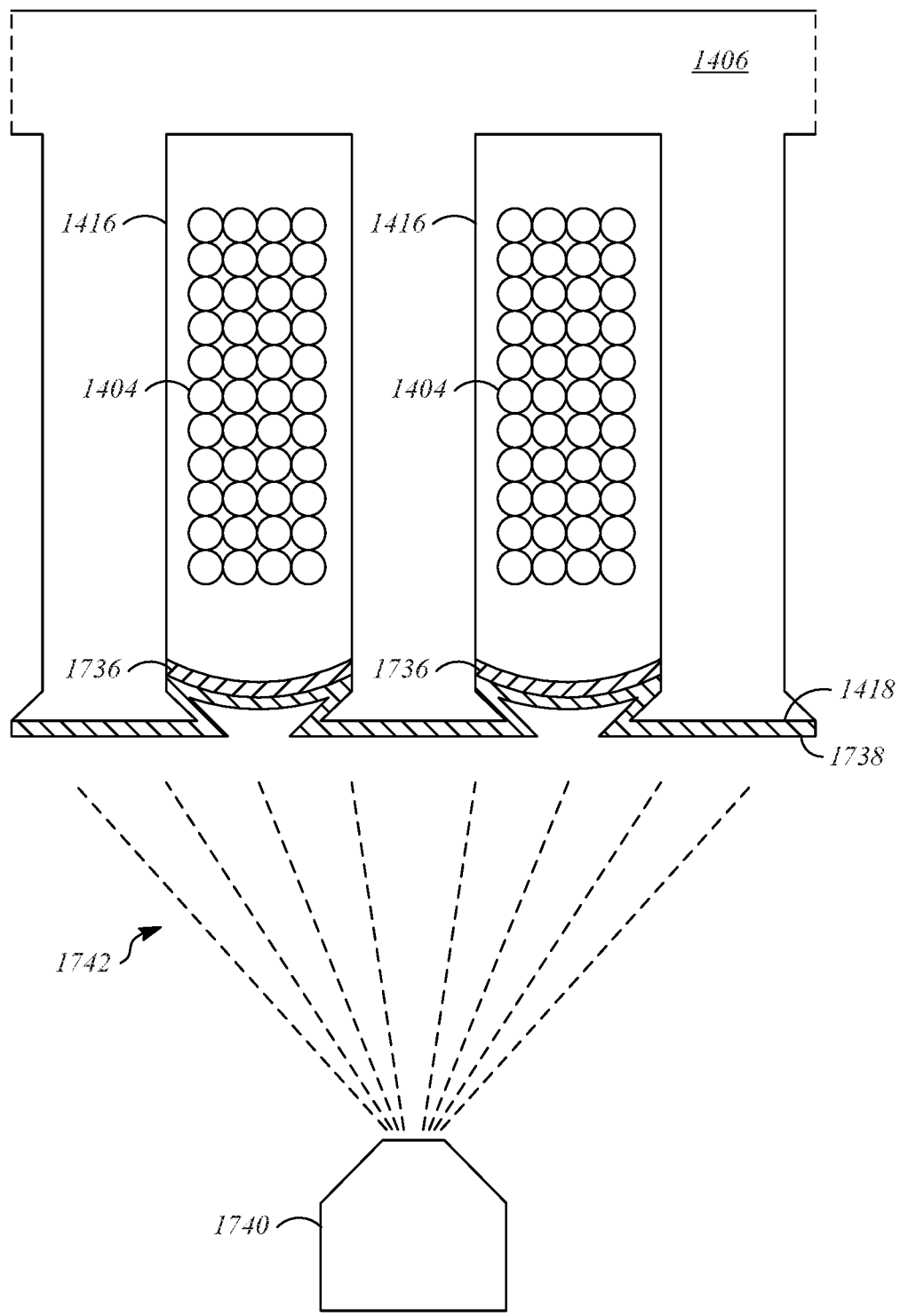
FIG. 17 is an illustration showing application of a shield coating to a portion of the stator of the electric motor of FIG. 14 according to an alternative implementation.

FIG. 17 is an illustration showing application of a shield coating 1738 to a portion of the stator 1406 of the electric motor 1400 of FIG. 14 according to an alternative implementation. The previously described portions of the stator 1406 are the same except as noted herein. The shielded insulators 1414 are omitted and replaced with insulators 1736 that are similar to the insulating layer 1436 of the shielded insulators 1414 except that they lack the shield layer 1438. The stator 1406 is assembled by first installing the phase windings 1404, and then installing the insulators 1736 in each of the slots 1416 of the stator 1406. After the insulators 1736 are installed in each of the slots 1416 of the stator 1406 in the manner described with respect to the shielded insulators 1414, a shield coating 1738 is applied to the interior of the stator 1406, by forming a layer of material on the interior of the stator 1406 including on the inner periphery 1418 and on the insulators 1736. The shield coating 1738 may be, for example, a material that is able to conduct the electric field, such as metal that can be spray applied in melted state and subsequently harden on the inner periphery 1418 of the stator 1406 and on the insulators 1736. The shield coating 1738 may be applied to the interior of the stator 1406 using a tool such as an applicator 1740. As an example, the applicator 1740 may be operable to emit a spray 1742 of the material that becomes the shield coating 1738.

Figure 18:
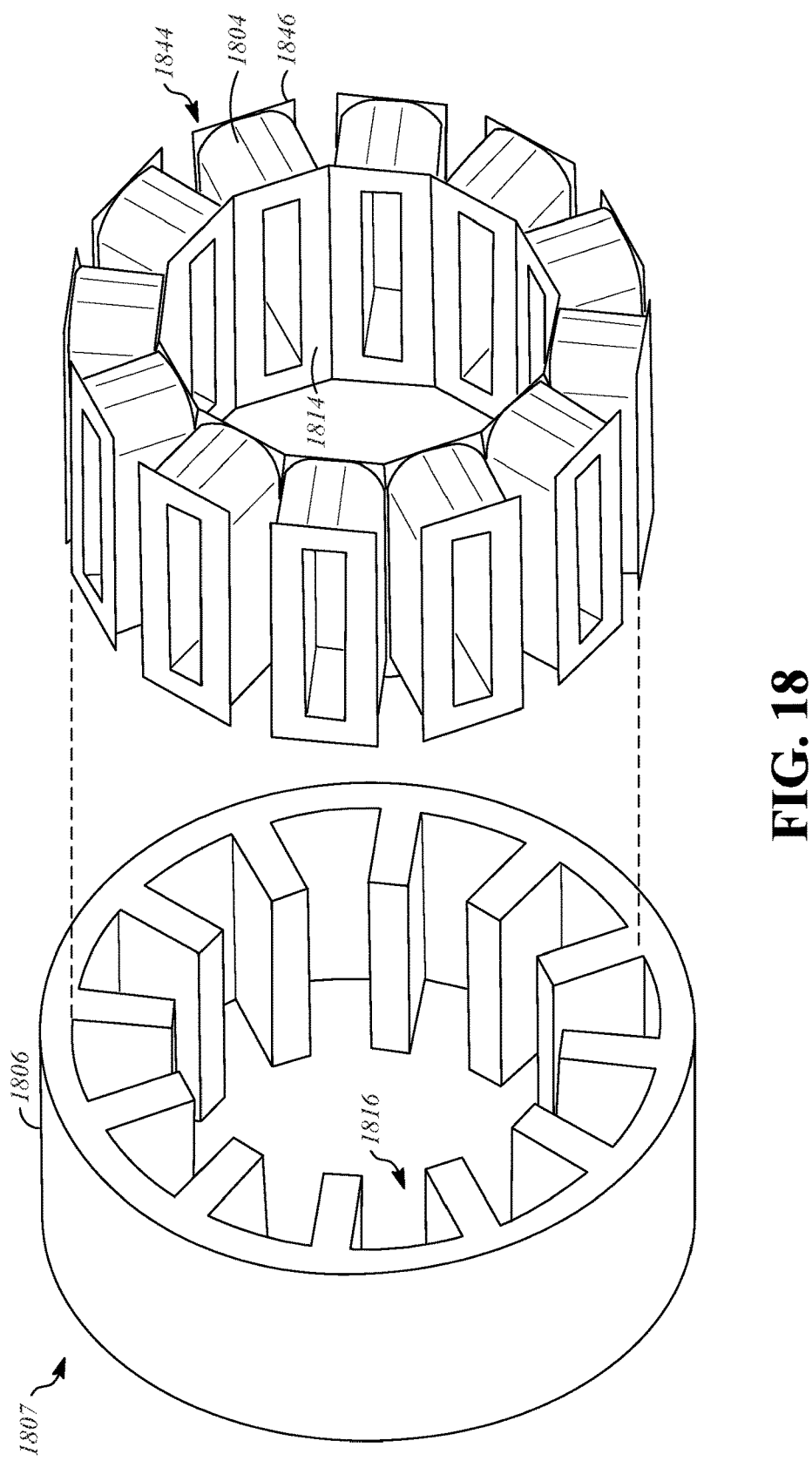
FIG. 18 is an exploded view of a stator assembly that includes a stator and a plurality of winding units.

FIG. 18 is an exploded view of a stator assembly 1807 that includes a stator 1806 and a plurality of winding units 1844 that are received in slots 1816 of the stator 1806. The stator assembly 1807 can be incorporated in an electric motor, such as in the electric motor 200 in place of the stator 206 and the shield 214.

The winding units 1844 each include a bracket 1846 and a phase winding 1804 that is disposed on the bracket 1846. The brackets 1846 may be formed from a material that does not readily the electric field, such as plastic. A shield layer 1814 may be disposed on an interior surface of each of the brackets 1846.

Figure 19:
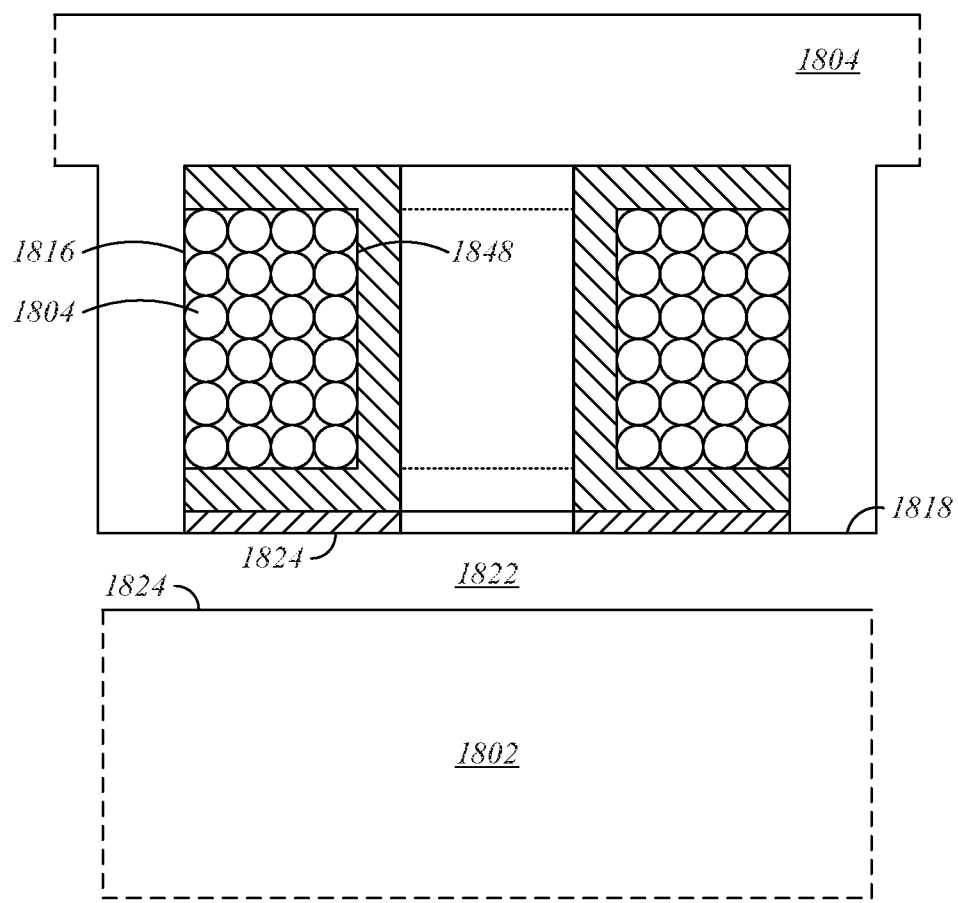
FIG. 19 is an illustration showing a portion of the stator assembly of FIG. 16 and a portion of a rotor.

FIG. 19 is an illustration showing a portion of the stator assembly 1807 and a portion of a rotor 1802. The phase windings 1804 are disposed at least partially in the slots 1816 that are formed in the stator 1806. The slots 1816 are open ended slots that extend radially outward from openings at the inner periphery 1818 of the stator 1806. The phase windings 1804 are further disposed in a channel 1848 that is formed on and extends peripherally around the bracket 1846. The channel 1848 may be substantially u-shaped and defined by adjacent wall portions of the bracket 1846.

The shield layer 1814 is disposed on a surface of the bracket 1846 and is positioned at the open end of the slot 1816 such that it extends between portions of the stator 1806 that are adjacent to the slot 1816 (e.g. stator teeth). The shield layer 1814 may be in contact with the stator 1806 on opposed sides of the slot. A radial air gap 1822 is present between inner periphery 1818 of the stator 1806 and the outer periphery 1824 of the rotor 1802. Thus, the bracket 1846 serves as an insulating element that is positioned between the phase windings 1804 and the rotor 1802, while the shield layer 1814 is disposed on the bracket 1846 and is therefore positioned between the phase windings 1804 and the rotor 1802. Because the electric field generated by the phase windings 1804 passes through the shield layer 1814 before reaching the rotor 1802, at least some of the electric field that is generated by the phase windings 1804 is directed back into the stator 1806 by the shield layer 1814 so that it does not enter the rotor 1802. By reducing the amount of the electric field that is incident on the rotor 1802, the parasitic capacitance C_wr is reduced.

What is claimed is:

1. An electric motor, comprising:
    a rotor that extends along a rotation axis and has an outer periphery;
    a stator having an inner periphery that is separated from the outer periphery of the rotor by a radial air gap;
    slots formed in the stator, each slot having a slot width, and each slot being oriented along a line;
    phase windings connected to the stator and disposed at least partially in the slots, wherein the phase windings are energized and de-energized to induce torque on the rotor by interaction of magnetic fields generated by the phase windings with the rotor to cause rotation of the rotor around the rotation axis; and
    openings that extend from each slot to the inner periphery of the stator,
    wherein each opening is defined by opposed surfaces that are spaced apart by an opening width,
    wherein the opposed surfaces of each opening are parallel to one another,
    wherein the opposed surfaces of each opening are oriented at an opening angle between 15 degrees and 75 degrees relative to the line, and
    wherein the opening width of each opening is between five percent and twenty-five percent of the slot width.

2. The electric motor of claim 1, wherein the opening width and the opening angle of the opening are configured such that any straight-line path between the phase windings and the rotor is obstructed by a portion of the stator.

3. The electric motor of claim 1, wherein the rotor is spaced from the stator by a radial air gap that is larger than the opening width.

4. The electric motor of claim 1, wherein the opening width is constant.

5. The electric motor of claim 1, wherein the stator includes internal radial walls that extend across each slot adjacent to the opening such that a portion of the stator is positioned between each slot and the rotor.

6. The electric motor of claim 1, wherein the phase windings are wire-wound type phase windings.

7. The electric motor of claim 1, wherein the phase windings are bar-wound type phase windings.

* * * * *